United States Patent
Inagaki et al.

(10) Patent No.: US 11,273,728 B2
(45) Date of Patent: Mar. 15, 2022

(54) AUTOMOBILE COOLING DEVICE

(71) Applicant: Toyota Jidosha Kabushiki Kaisha, Toyota (JP)

(72) Inventors: Takehiro Inagaki, Kasugai (JP); Makoto Kuze, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/142,807

(22) Filed: Sep. 26, 2018

(65) Prior Publication Data
US 2019/0143837 A1 May 16, 2019

(30) Foreign Application Priority Data
Nov. 10, 2017 (JP) .............................. JP2017-217043

(51) Int. Cl.
B60L 58/26 (2019.01)
B60H 1/00 (2006.01)
(Continued)

(52) U.S. Cl.
CPC .............. B60L 58/26 (2019.02); B60H 1/004 (2013.01); B60H 1/00778 (2013.01);
(Continued)

(58) Field of Classification Search
CPC ..... B60L 58/26; B60H 1/004; B60H 1/00778; B60H 1/00828; B60K 1/00; B60K 6/46;
(Continued)

(56) References Cited

U.S. PATENT DOCUMENTS 10,220,679 B2 * 3/2019 Sakane ................ B60H 1/2218
2003/0117019 A1 * 6/2003 Furukawa .............. B60L 58/20
307/10.6
(Continued)

FOREIGN PATENT DOCUMENTS

CN 101868600 A 10/2010
CN 103010000 A 4/2013
(Continued)

OTHER PUBLICATIONS

Noguchi Yasuhiko, The in-vehicle system and control method, Dec. 2009, pp. 1-20 (Year: 2009).*

Primary Examiner — Jess Whittington
Assistant Examiner — Terry C Buse
(74) Attorney, Agent, or Firm — Dinsmore & Shohl LLP

(57) ABSTRACT

An automobile includes a fan configured to send cooling air, a fan driving apparatus, a first electronic control unit, and a second electronic control unit. The first electronic control unit is configured to output a first driving control signal to the fan driving apparatus when an ignition switch is turned off and a predetermined condition is established. The second electronic control unit is configured to determine whether or not the first driving control signal has been output by monitoring the signal line when the ignition switch is turned off. The second electronic control unit is configured to output a second driving control signal to the fan driving apparatus when determination is made that the first driving control signal has not been output to the fan driving apparatus from the first electronic control unit, the ignition switch is turned off, and the predetermined condition is established.

4 Claims, 4 Drawing Sheets

(51) Int. Cl.
*B60K 1/00* (2006.01)
*F01P 5/02* (2006.01)
*F01P 3/18* (2006.01)
*F01P 5/04* (2006.01)
*B60K 6/48* (2007.10)
*B60K 11/02* (2006.01)
*B60K 6/46* (2007.10)

(52) U.S. Cl.
CPC ........... *B60H 1/00828* (2013.01); *B60K 1/00* (2013.01); *F01P 3/18* (2013.01); *F01P 5/02* (2013.01); *B60K 6/46* (2013.01); *B60K 6/48* (2013.01); *B60K 11/02* (2013.01); *B60K 2001/005* (2013.01); *B60Y 2200/92* (2013.01); *F01P 5/04* (2013.01); *F01P 2003/185* (2013.01); *F01P 2005/046* (2013.01); *F01P 2050/24* (2013.01)

(58) Field of Classification Search
CPC .... B60K 6/48; B60K 11/02; B60K 2001/005; F01P 3/18; F01P 5/02; F01P 5/04; F01P 2003/185; F01P 2005/046; F01P 2050/24; B60Y 2200/92

USPC ......................................................... 701/22
See application file for complete search history.

(56) References Cited

U.S. PATENT DOCUMENTS

| | | | |
|---|---|---|---|
| 2004/0100225 A1* | 5/2004 | Neil | B60L 58/26 320/109 |
| 2010/0236502 A1 | 9/2010 | Watanabe et al. | |
| 2011/0190981 A1* | 8/2011 | Niwa | H04L 12/2838 701/36 |
| 2012/0193068 A1* | 8/2012 | Nemesh | H01M 10/625 165/41 |

FOREIGN PATENT DOCUMENTS

| | | | | |
|---|---|---|---|---|
| JP | H11139155 A | | 5/1999 | |
| JP | 2005-299407 A | | 10/2005 | |
| JP | 2009232330 | * | 12/2009 | ............ B60R 16/02 |
| JP | 2016-113994 A | | 6/2016 | |
| WO | 2005121521 A2 | | 12/2005 | |

* cited by examiner

AUTOMOBILE COOLING DEVICE

CROSS-REFERENCE TO RELATED APPLICATIONS

This application claims priority to Japanese Patent Application No. 2017-217043 filed on Nov. 10, 2017, which is incorporated herein by reference in its entirety including the specification, drawings and abstract.

BACKGROUND

I. Technical Field

The present disclosure relates to an automobile.

2. Description of Related Art

In the related art, in automobiles in which a coolant of an engine and a refrigerant of an air conditioner are cooled by driving an electric fan by a fan driving circuit, automobiles including an air conditioning control device and an engine control device have been proposed (see, for example, Japanese Unexamined Patent Application Publication No. 2016-113994 (JP 2016-113994 A)). The air conditioning control device outputs a driving control signal to a fan driving circuit at the time of performing pre-air conditioning for operating an air conditioner when an ignition switch is turned off. The engine control device outputs a driving control signal to the fan driving circuit in order to perform high temperature restart after the ignition switch is turned off. In the automobile, the output of the driving control signal from the air conditioning control device to the fan driving circuit is prohibited until a predetermined time elapses after the ignition switch is turned off. As described above, the driving control signal transmitted from the engine control device and the driving control signal transmitted from the air conditioning control device do not interfere with each other.

SUMMARY

In the above-described automobile, when the driving control signal is not output from the engine control device until a predetermined time elapses after the ignition switch is turned off, the driving control of the electric fan cannot be performed even when a request for driving the electric fan based on pre-air conditioning or the like is given to a control device (for example, the air conditioning control device) which is different from the engine control device.

The present disclosure provides an automobile that enables a second electronic control unit to immediately perform the driving control of a fan when the driving control of the fan is not performed by a first electronic control unit, in a case where an ignition switch is turned off.

An aspect of the present disclosure relates to an automobile including a fan configured to send cooling air to at least one of a cooling device for an engine, an air conditioner performing air conditioning within an occupant compartment, and a cooling device for an object to be cooled which is different from the engine, a fan driving apparatus configured to drive the fan, a first electronic control unit connected to the fan driving apparatus through a signal line, and a second electronic control unit connected to the signal line. The first electronic control unit is configured to output a first driving control signal to the fan driving apparatus through the signal line when an ignition switch is turned off and a predetermined condition is established. The second electronic control unit is configured to determine whether or not the first driving control signal has been output to the fan driving apparatus from the first electronic control unit by monitoring the signal line when the ignition switch is turned off. The second electronic control unit is configured to output a second driving control signal to the fan driving apparatus through the signal line when determination is made that the first driving control signal has not been output to the fan driving apparatus from the first electronic control unit, the ignition switch is turned off, and the predetermined condition is established.

In the automobile according to the aspect of the present disclosure, the second electronic control unit is connected to the signal line to which the fan driving apparatus driving the fan and the first electronic control unit are connected. The second electronic control unit determines whether or not the driving control signal has been output to the fan driving apparatus from the first electronic control unit by monitoring the signal line, when the ignition switch is turned off. The second electronic control unit outputs the driving control signal to the fan driving apparatus through the signal line when determination is made that the driving control signal has not been output to the fan driving apparatus from the first electronic control unit, the ignition switch is turned off, and the predetermined condition is established. According to the aspect of the present disclosure, when the driving control of the fan is not performed by the first electronic control unit in a case where the ignition switch is turned off, it is possible to immediately perform the driving control of the fan by the second electronic control unit.

In the automobile according to the aspect of the present disclosure, the second electronic control unit may be configured to determine that a request for driving the fan is given when the ignition switch is turned off and pre-air conditioning which is air conditioning within the occupant compartment is executed by the air conditioner. According to the aspect of the present disclosure, it is possible to immediately perform the driving control of the fan by the second electronic control unit without driving the fan by the first electronic control unit when the pre-air conditioning is executed.

The automobile according to the aspect of the present disclosure may further include a power storage device configured to exchange electric power with a motor, and a charger configured to execute external charging for charging the power storage device by using electric power received from an external power supply. The object to be cooled may be the power storage device, and the second electronic control unit may be configured to determine that the request for driving the fan is given when the ignition switch is turned off and the external charging is executed. According to the aspect of the present disclosure, it is possible to immediately perform the driving control of the fan by the second electronic control unit without driving the fan by the first electronic control unit when the external charging is executed.

In the automobile according to the aspect of the present disclosure, the signal line may include a filter circuit. According to the aspect of the present disclosure, it is possible to further improve noise tolerance of the signal line.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described using an example.

Figure 1:
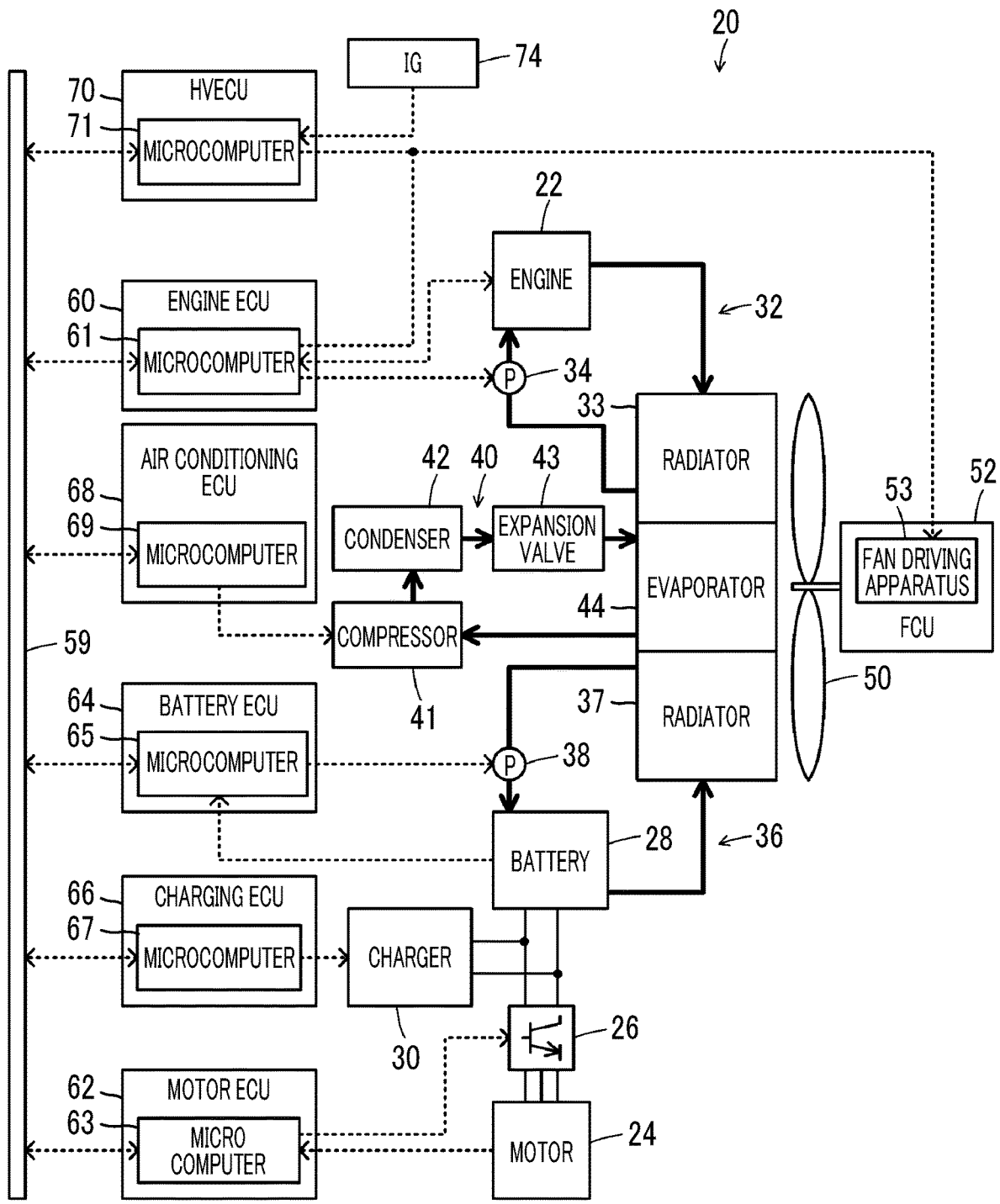
FIG. 1 is a schematic configuration diagram illustrating a configuration of a hybrid automobile as an example of the present disclosure.

FIG. 1 is a schematic configuration diagram illustrating a configuration of a hybrid automobile 20 as an example of the present disclosure. As illustrated in the drawing, the hybrid automobile 20 according to the example is configured as a series hybrid automobile or a parallel hybrid automobile. The hybrid automobile 20 includes an engine 22, at least one motor 24, an inverter 26 that drives the motor 24, a battery (power storage device) 28 that exchanges electric power with the motor 24 through the inverter 26, a charger 30 that charges the battery 28 by using electric power received from an external power supply, an engine cooling device 32 that cools the engine 22, a motor cooling device (not shown) that cools the motor 24 and the inverter 26, a battery cooling device 36 that cools the battery 28, an air conditioner 40 that performs air conditioning within an occupant compartment, a fan 50, and a fan driving unit (hereinafter, referred to as a "fan coil unit (FCU)") 52. The motor cooling device does not constitute the core of the present disclosure, and is thus not illustrated in the drawing. The hybrid automobile 20 includes an electronic control unit for an engine (hereinafter, referred to as an "engine ECU") 60, an electronic control unit for a motor (hereinafter, referred to as a "motor ECU") 62, an electronic control unit for a battery (hereinafter, referred to as a "battery ECU") 64, an electronic control unit for charging (hereinafter, referred to as a "charging ECU") 66, an electronic control unit for air conditioning (hereinafter, referred to as an "air conditioning ECU") 68, and an electronic control unit for a hybrid vehicle (hereinafter, referred to as an "HVECU") 70.

The engine 22 is configured as an internal combustion engine that outputs power by using gasoline, diesel oil, and the like as fuel, and the operation control thereof is performed by the engine ECU 60. The motor 24 is configured as, for example, a synchronous generator-motor, and the rotation driving thereof is performed by performing the switching control of a plurality of switching elements, not shown in the drawing, of the inverter 26 by the motor ECU 62. The battery 28 is configured as, for example, a lithium ion secondary battery or a nickel-hydrogen secondary battery, and is managed by the battery ECU 64. The charger 30 is configured so as to be capable of executing external charging for charging the battery 28 by using electric power received from an external power supply, such as a household power supply or an industrial power supply, when the charger is connected to the external power supply at a charging point such as one's house or a charging station. The charger 30 is controlled by the charging ECU 66.

The engine cooling device 32 includes a radiator 33 that cools a coolant by heat exchange with traveling air or cooling air from the fan 50, and a water pump 34 that circulates the coolant in the engine 22 and the radiator 33. The water pump 34 is controlled by the engine ECU 60.

Although not illustrated in the drawing, the motor cooling device includes a radiator that cools a coolant by heat exchange with traveling air or cooling air from the fan 50, and a water pump that circulates the coolant in the motor 24, the inverter 26, and a radiator 37. The water pump is controlled by the motor ECU 62.

The battery cooling device 36 includes the radiator 37 that cools the coolant by heat exchange with traveling air or cooling air from the fan 50, and a water pump 38 that circulates the coolant in the battery 28 and the radiator 37. The water pump 38 is controlled by the battery ECU 64.

The air conditioner 40 has a refrigeration cycle including a compressor 41 that compresses a refrigerant of a low-temperature and low-pressure gas to convert the refrigerant into a refrigerant of a high-temperature and high-pressure gas or a semi-liquid, a capacitor (condenser) 42 that converts a refrigerant of a high-temperature and high-pressure gas or a semi-liquid into a refrigerant of a room-temperature and high-pressure liquid, an expansion valve 43 that expands a refrigerant of a room-temperature and high-pressure liquid to convert the refrigerant into a refrigerant of a low-temperature and low-pressure liquid, and an evaporator 44 that converts a refrigerant of a low-temperature and low-pressure liquid into a refrigerant of a low-temperature and low-pressure gas. The compressor 41 is controlled by the air conditioning ECU 68. Air cooled by heat exchange with the evaporator 44 is sent into the occupant compartment by the fan 50, and thus air conditioning (cooling) within the occupant compartment is performed.

The fan 50 sends air to the radiator 33 of the engine cooling device 32, the radiator 37 of the battery cooling device 36, and the evaporator 44 of the air conditioner 40. The FCU 52 includes a fan driving apparatus 53 that drives the fan 50 based on a driving control signal received from the engine ECU 60 or the HVECU 70.

The engine ECU 60 includes a microcomputer 61 including a central processing unit (CPU), a read only memory (ROM), a random access memory (RAM), an input/output port, and a communication port. Signals from various sensors which are needed to perform the operation control of the engine 22 and a coolant temperature Tweg from a temperature sensor (not shown) detecting the temperature of a coolant of the engine cooling device 32 are input to the microcomputer 61 through an input port thereof. Various control signals for performing the operation control of the engine 22, a driving control signal to the water pump 34 of the engine cooling device 32, and a driving control signal to the FCU 52 are output from the microcomputer 61 through an output port thereof.

The motor ECU 62 includes a microcomputer 63 including a CPU, a ROM, a RAM, an input/output port, and a communication port. Signals from various sensors which are needed to perform the driving control of the motor 24 are input to the microcomputer 63 through an input port thereof. A driving control signal to the inverter 26 and a driving control signal to a water pump of a motor cooling device (not shown) are output from the microcomputer 63 through an output port thereof.

The battery ECU 64 includes a microcomputer 65 including a CPU, a ROM, a RAM, an input/output port, and a communication port. Signals from various sensors which are needed to manage the battery 28 and a coolant temperature Twbt from the temperature sensor (not shown) detecting the temperature of a coolant of the battery cooling device 36 are input to the microcomputer 65 through an input port thereof.

A driving control signal to the water pump 38 of the battery cooling device 36 is output from the microcomputer 65 through an output port thereof.

The charging ECU 66 includes a microcomputer 67 including a CPU, a ROM, a RAM, an input/output port, and a communication port. A driving control signal to the charger 30 is output from the microcomputer 67 through an output port thereof.

The air conditioning ECU 68 includes a microcomputer 69 including a CPU, a ROM, a RAM, an input/output port, and a communication port. Signals from various sensors which are needed to control the air conditioner 40 (to perform air conditioning within the occupant compartment), for example, turn-on and turn-off signals from an air conditioning (cooling) switch (not shown) which is provided in an operation panel, a target temperature Tin* within the occupant compartment from a target temperature setting switch (not shown) provided in the operation panel, and an occupant compartment temperature Tin from the temperature sensor (not shown) detecting temperature within the occupant compartment are input to the microcomputer 69 through an input port thereof. A driving control signal to the compressor 41 of the air conditioner 40 is output from the microcomputer 69 through an output port thereof.

The HVECU 70 includes a microcomputer 71 including a CPU, a ROM, a RAM, an input/output port, and a communication port. An ignition signal from an ignition switch 74 is input to the microcomputer 71 through an input port thereof. A driving control signal to the FCU 52 is output from the microcomputer 71 through an output port thereof.

The microcomputer 61 of the engine ECU 60, the microcomputer 63 of the motor ECU 62, the microcomputer 65 of the battery ECU 64, the microcomputer 67 of the charging ECU 66, the microcomputer 69 of the air conditioning ECU 68, and the microcomputer 71 of the HVECU 70 are communicatively connected to each other through a communication line 59.

Figure 2:
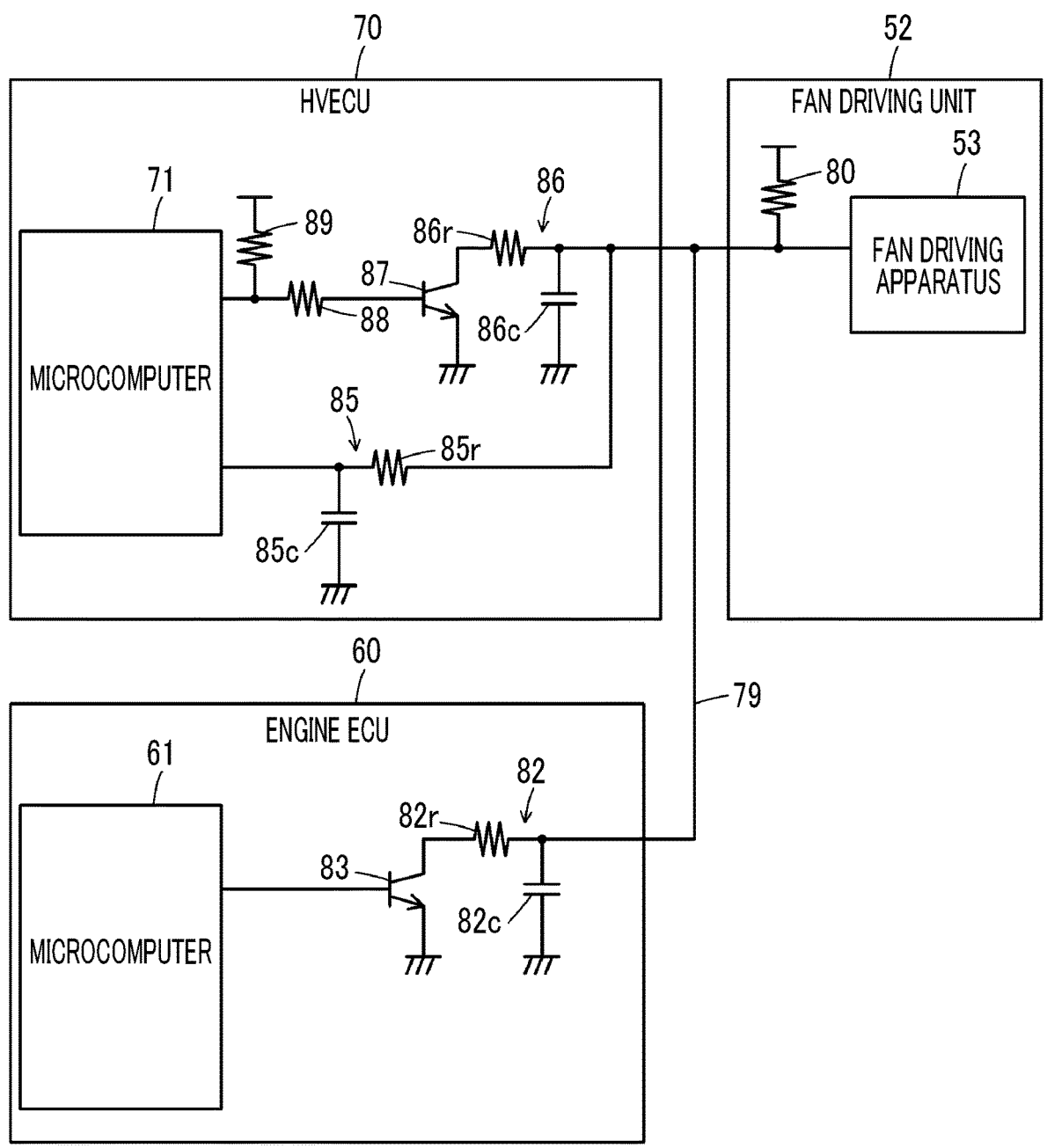
FIG. 2 is a circuit diagram illustrating connection circuits between an engine ECU, an HVECU, and an FCU.

FIG. 2 is a circuit diagram illustrating connection circuits between the engine ECU 60, the HVECU 70, and the FCU 52. As illustrated in FIG. 2, the microcomputer 61 of the engine ECU 60, the microcomputer 71 of the HVECU 70, and the fan driving apparatus 53 of the FCU 52 are connected to each other through a signal line 79.

The signal line 79 is connected to a positive electrode terminal of an auxiliary battery (not shown) through a pull-up resistive element 80 within the FCU 52. The signal line 79 is connected to a switching element 83 through a filter circuit 82 within the engine ECU 60. The filter circuit 82 includes a resistive element 82r connected to the signal line 79 and the switching element 83, and a capacitor 82c connected to the signal line 79 side of the resistive element 82r and a ground. The switching element 83 is configured such that a collector is connected to the filter circuit 82 (resistive element 82r), an emitter is grounded, and a base is connected to the microcomputer 61. The switching element 83 is turned on and off in accordance with a signal from the microcomputer 61, and sets a potential Vs of the signal line 79 to be at a "Lo" level or a "Hi" level.

The signal line 79 is connected to the microcomputer 71 through a filter circuit 85 within the HVECU 70. The signal line 79 is connected to a switching element 87 through a filter circuit 86. The filter circuit 85 includes a resistive element 85r connected to the signal line 79 and the microcomputer 71, and a capacitor 85c connected to the microcomputer 71 side of the resistive element 85r and a ground. The filter circuit 86 includes a resistive element 86r connected to the signal line 79 and the switching element 87, and a capacitor 86c connected to the signal line 79 side of the resistive element 86r and a ground. The switching element 87 is configured such that a collector is connected to the filter circuit 86 (resistive element 86r), an emitter is grounded, and a base is connected to the microcomputer 71 through a resistive element 88. The switching element 87 is turned on and off in accordance with a signal from the microcomputer 71, and sets a potential Vs of the signal line 79 to be at a "Lo" level or a "Hi" level. A positive electrode terminal of an auxiliary battery (not shown) is connected between the microcomputer 71 and the resistive element 88 through a pull-up resistive element 89.

The filter circuits 82, 85, and 86 mentioned above are provided, and thus it is possible to further improve noise tolerance of the potential Vs of the signal line 79 and an input potential Vin to be input to the microcomputer 71 through the filter circuit 85 from the signal line 79.

In the hybrid automobile 20 according to the example which is configured as described above, the driving control of the engine 22 and the motor 24 are performed such that traveling is performed in accordance with request torque for traveling based on an accelerator operation quantity and a vehicle speed of a driver while the power storage ratio state of charge (SOC) of the battery 28 is held within a predetermined range, by cooperative control with the microcomputer 71 of the HVECU 70, the microcomputer 61 of the engine ECU 60, the microcomputer 63 of the motor ECU 62, and the microcomputer 65 of the battery ECU 64 when the ignition switch 74 is turned on.

When the ignition switch 74 is turned on, the microcomputer 61 of the engine ECU 60 performs the driving control of the water pump 34 and the driving control of the fan 50 based on the coolant temperature Tweg of the engine cooling device 32. The microcomputer 63 of the motor ECU 62 performs the driving control of the water pump based on a coolant temperature Twmt of the motor cooling device. The microcomputer 65 of the battery ECU 64 performs the driving control of the water pump 38 based on the coolant temperature Twbt of the battery cooling device 36. The microcomputer 69 of the air conditioning ECU 68 performs the driving control of the compressor 41 of the air conditioner 40 based on the target temperature Tin* and the occupant compartment temperature Tin within the occupant compartment in a case where an air conditioning switch is turned on. As described above, the engine 22, the motor 24, the inverter 26, and the battery 28 are cooled, and air conditioning (cooling) within the occupant compartment is performed.

Even when the ignition switch 74 is turned off, the microcomputer 61 of the engine ECU 60 performs the driving control of the water pump 34 and the driving control of the fan 50 until a dead soak condition, such as the coolant temperature Tweg of the engine cooling device 32 being higher than a threshold value Twegref, is not established or a predetermined time Tds (for example, two minutes, three minutes, four minutes, or the like) elapses, when the dead soak condition is established.

The driving control of the fan 50 which is performed by the microcomputer 61 of the engine ECU 60 will be described. The microcomputer 61 of the engine ECU 60 sets a target duty Df* of the fan 50 based on the coolant temperature Tweg of the engine cooling device 32, and performs the switching control of the switching element 83 based on the target duty Df* and a carrier frequency (for example, 200 Hz, 250 Hz, 300 Hz, or the like) fc1. As described above, the potential Vs of the signal line 79 switches between a "Lo" level and a "Hi" level. As described above, a driving control signal (pulse signal) is output to the fan driving apparatus 53 of the FCU 52 through the signal line 79 from the microcomputer 61 (switching element 83) of the engine ECU 60. The fan driving apparatus 53 performs the driving control of the fan 50 based on the driving control signal.

Figure 3:
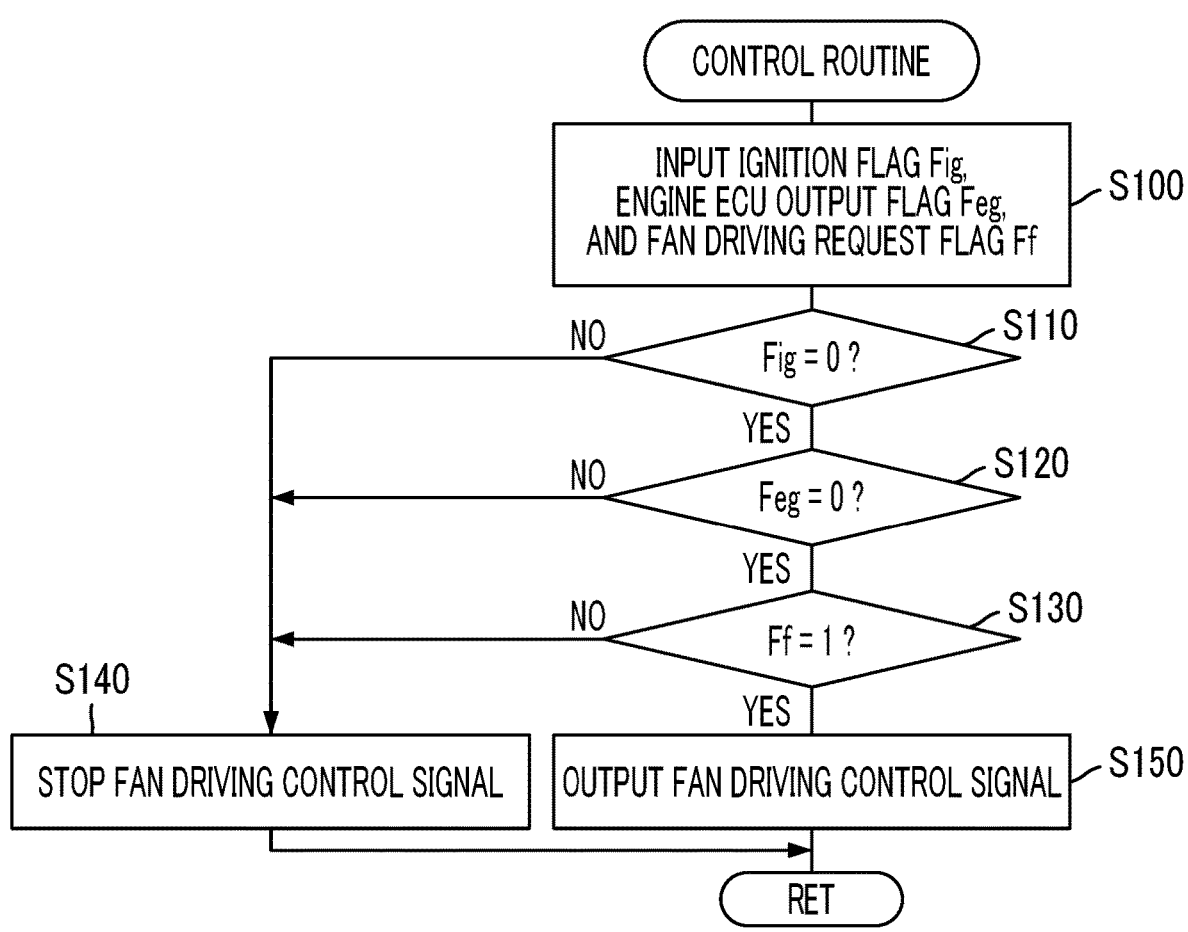
FIG. 3 is a flowchart illustrating an example of a control routine executed by the HVECU.

An action of the hybrid automobile 20 according to the example which is configured as described above, and particularly, an action regarding whether or not the driving control of the fan 50 is performed by the microcomputer 71 of the HVECU 70 will be described. FIG. 3 is a flowchart illustrating an example of a control routine executed by the HVECU 70. The routine is repeatedly executed.

When the control routine of FIG. 3 is executed, the microcomputer 71 of the HVECU 70 inputs data such as an ignition flag Fig, an engine ECU output flag Feg, and a fan driving request flag Ff (step S100). Here, the ignition flag Fig having a value of 1 set therefor is input when the ignition switch 74 is turned on, and the ignition flag Fig having a value of 0 set therefor is input when the ignition switch 74 is turned off.

The engine ECU output flag Feg having a value of 1 set therefor is input when a driving control signal is output to the fan driving apparatus 53 of the FCU 52 from the microcomputer 61 of the engine ECU 60, and the engine ECU output flag Feg having a value of 0 set therefor is input when a driving control signal is not output. It can be ascertained whether or not a pulse signal has been output to the FCU 52 from the engine ECU 60 by monitoring the signal line 79, and specifically, monitoring an input potential Vin to be input to the microcomputer 71 through the filter circuit 85 from the signal line 79.

In the example, when the input potential Vin switches between a "Lo" level and a "Hi" level, determination is made that a pulse signal has been output to the FCU 52 from the engine ECU 60. When the input potential Vin is held at a "Lo" level for a predetermined time (for example, 8 msec, 16 msec, 24 msec, or the like) which is longer than a time (4 msec when a predetermined frequency is 250 Hz) corresponding to the carrier frequency fc1, determination is made that a pulse signal has not been output to the FCU 52 from the engine ECU 60.

The fan driving request flag Ff having a value of 1 set therefor is input when a request for driving the fan 50 based on the execution of pre-air conditioning and external charging has been received from the microcomputer 69 of the air conditioning ECU 68 or the microcomputer 65 of the battery ECU 64, and the fan driving request flag Ff having a value of 0 is input when the request has not been received. Here, the "pre-air conditioning" is air conditioning within the occupant compartment which is performed by the air conditioner 40 when the ignition switch 74 is turned off. The "external charging" is the charging of the battery 28 which is performed using electric power received from an external power supply by the charger 30 when the ignition switch 74 is turned off and the charger 30 is connected to the external power supply.

When the pre-air conditioning is executed, the microcomputer 69 of the air conditioning ECU 68 transmits the request for driving the fan 50 and the target duty Df* to the microcomputer 71 of the HVECU 70 through the communication line 59, and performs the driving control of the compressor 41 of the air conditioner 40 based on the target temperature Tin* and the occupant compartment temperature Tin within the occupant compartment.

When the external charging is executed, the microcomputer 65 of the battery ECU 64 transmits the request for driving the fan 50 and the target duty Df* to the microcomputer 71 of the HVECU 70 through the communication line 59 and performs the driving control of the water pump 38 based on the coolant temperature Twbt of the battery cooling device 36, and the microcomputer 67 of the charging ECU 66 performs the driving control of the charger 30 based on the power storage ratio SOC and a target ratio SOC* of the battery 28 by cooperative control with the microcomputer 65 of the battery ECU 64.

When data is input as described above, the values of the ignition flag Fig, the engine ECU output flag Feg, and the fan driving request flag Ff which are input are examined (steps S110 to S130). When the ignition flag Fig has a value of 1 in step S110, the engine ECU output flag Feg has a value of 1 in step S120, and the fan driving request flag Ff has a value of 0 in step S130, determination is made that the ignition switch 74 is turned on, a driving control signal has been output to the fan driving apparatus 53 of the FCU 52 from the microcomputer 61 of the engine ECU 60, and a request for driving the fan 50 based on the execution of pre-air conditioning and external charging has not been received, and this routine is terminated without outputting a driving control signal to the fan driving apparatus 53 (step S140).

Therefore, a driving control signal is not output to the fan driving apparatus 53 from the microcomputer 71 of the HVECU 70 when the driving control signal is output to the fan driving apparatus 53 of the FCU 52 from the microcomputer 61 of the engine ECU 60, and thus it is possible to restrain both the driving control signals from interfering with each other.

When the ignition flag Fig has a value of 0 in step S110, the engine ECU output flag Feg has a value of 0 in step S120, and the fan driving request flag Ff has a value of 1 in step S130, determination is made that the ignition switch 74 is turned off, a driving control signal has not been output to the fan driving apparatus 53 of the FCU 52 from the microcomputer 61 of the engine ECU 60, and a request for driving the fan 50 based on the execution of pre-air conditioning and external charging has been received, and the driving control of the fan 50 is performed by the microcomputer 71 of the HVECU 70 (step S150), whereby this routine is terminated.

In this case, the microcomputer 71 of the HVECU 70 performs the switching control of the switching element 87 based on the target duty Df* and the carrier frequency (for example, 200 Hz, 250 Hz, 300 Hz, or the like) fc2 of the fan 50 which are received from the microcomputer 65 of the battery ECU 64 and the microcomputer 69 of the air conditioning ECU 68. As described above, the potential Vs of the signal line 79 switches between a "Lo" level and a "Hi" level. As described above, a driving control signal is output to the fan driving apparatus 53 of the FCU 52 through the signal line 79 from the microcomputer 71 (switching element 87) of the HVECU 70. The fan driving apparatus 53 performs the driving control of the fan 50 based on the driving control signal.

By the above-described control, it is possible to immediately perform the driving control of the fan 50 by the microcomputer 71 of the HVECU 70 when the driving control of the fan 50 is not performed by the microcomputer 61 of the engine ECU 60, unlike a case where the driving control of the fan 50 by the microcomputer 71 of the HVECU 70 is prohibited until a predetermined time Tds elapses after the ignition switch 74 is turned off. As a result, it is possible to reduce time from when instructions of pre-air conditioning and external charging are given to when the execution thereof is started, in executing the pre-air conditioning and the external charging on condition that the fan 50 is operating.

Figure 4:
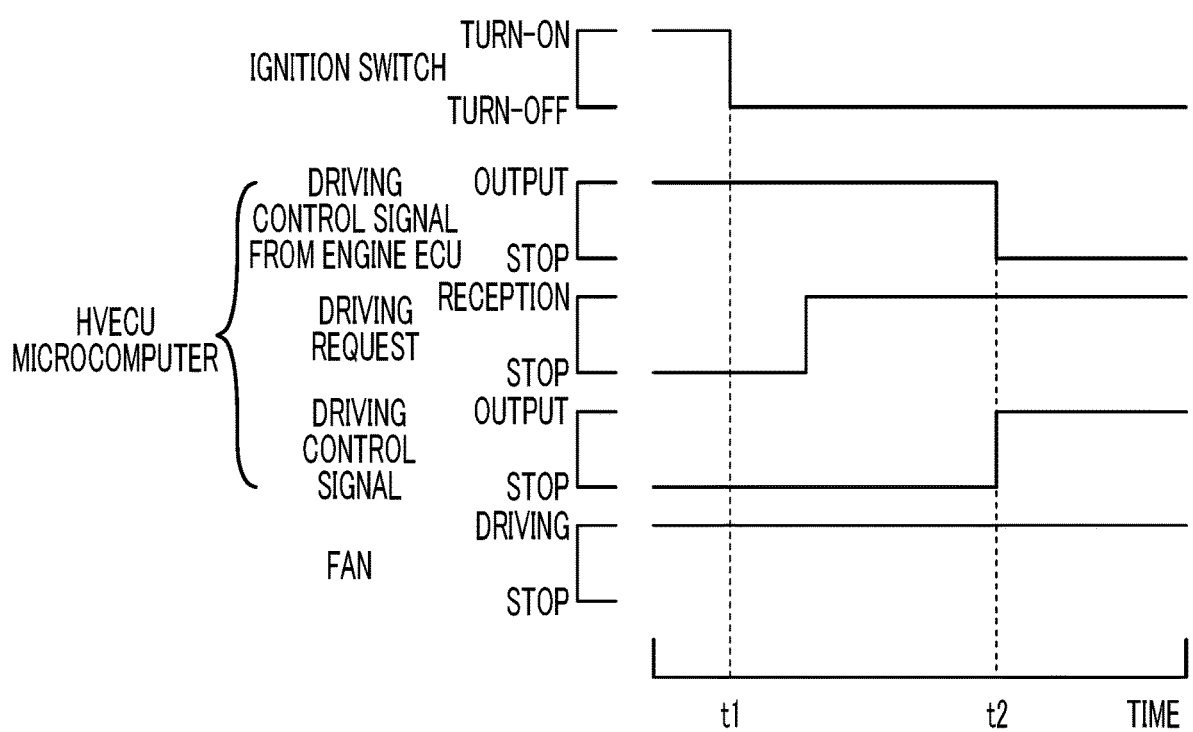
FIG. 4 is a diagram illustrating an example of a state when an ignition switch is turned off.

FIG. 4 is a diagram illustrating an example of a state when the ignition switch 74 is turned off. As illustrated in the drawing, when the ignition switch 74 is turned off (time t1) and a dead soak condition has been established, the output of a driving control signal from the microcomputer 61 of the engine ECU 60 to the fan driving apparatus 53 of the FCU 52 is continued. In this case (times t1 to t2), the microcomputer 71 of the HVECU 70 does not output a driving control signal to the fan driving apparatus 53 of the FCU 52 even when a request for driving the fan 50 for performing pre-air conditioning and external charging is received from the microcomputer 69 of the air conditioning ECU 68 and the microcomputer 65 of the battery ECU 64. As described above, it is possible to restrain the driving control signal received from the microcomputer 61 of the engine ECU 60 and the driving control signal received from the microcomputer 71 of the HVECU 70 from interfering with each other. The microcomputer 71 of the HVECU 70 outputs a driving control signal to the fan driving apparatus 53 of the FCU 52 from the microcomputer 71 of the HVECU 70 when the output of a driving control signal from the microcomputer 61 of the engine ECU 60 is stopped (time t2) and a request for driving the fan 50 is received from the microcomputer 69 of the air conditioning ECU 68 and the microcomputer 65 of the battery ECU 64. As described above, it is possible to immediately perform the driving control of the fan 50 by the microcomputer 71 of the HVECU 70 when the driving control of the fan 50 has not been performed by the microcomputer 61 of the engine ECU 60.

As described above, in the hybrid automobile 20 according to the above-described example, the microcomputer 71 of the HVECU 70 outputs a driving control signal of the fan driving apparatus 53 of the FCU 52 through the signal line 79 when a driving control signal of the fan driving apparatus 53 of the FCU 52 has not been output through the signal line 79 from the microcomputer 61 of the engine ECU 60 and a request for driving the fan 50 has been received from the microcomputer 69 of the air conditioning ECU 68 or the microcomputer 65 of the battery ECU 64, in a case where the ignition switch 74 is turned off. As described above, when the driving control of the fan 50 has not been performed by the microcomputer 61 of the engine ECU 60, it is possible to immediately perform the driving control of the fan 50 by the microcomputer 71 of the HVECU 70. As a result, it is possible to reduce time from when requests for pre-air conditioning and external charging are given to when the execution thereof is started, in executing the pre-air conditioning and the external charging on condition that the fan 50 is operating.

In the hybrid automobile 20 according to the example, the filter circuits 82, 85, and 86 are installed in the signal line 79, but at least some of the filter circuits 82, 85, and 86 may not be provided.

In the hybrid automobile 20 according to the example, the battery cooling device 36 cooling the battery 28 and the air conditioner 40 performing air conditioning within the occupant compartment are provided, but the cooling of the battery 28 and air conditioning within the occupant compartment may be performed by sending air cooled by heat exchange with the evaporator 44 of the air conditioner 40 into the occupant compartment and to the battery 28 by means of the fan 50.

In the hybrid automobile 20 according to the example, the cooling device (not shown) cooling the motor 24 and the inverter 26, and the battery cooling device 36 cooling the battery 28 are provided, but the motor 24, the inverter 26, the battery 28, and the radiator 37 may be cooled by circulating a coolant in the motor 24, the inverter 26, and the battery 28 by means of the motor cooling device (not shown) or the battery cooling device 36.

In the hybrid automobile 20 according to the example, the battery 28 is used as a power storage device, but a capacitor and the like may be used as a power storage device as long as it is a device capable of storing power.

In the hybrid automobile 20 according to the example, the engine ECU 60, the motor ECU 62, the battery ECU 64, the charging ECU 66, the air conditioning ECU 68, and the HVECU 70 are provided. However, at least two of the motor ECU 62, the battery ECU 64, the charging ECU 66, the air conditioning ECU 68, and the HVECU 70 may be constituted by a single electronic control unit.

In the hybrid automobile 20 according to the example, the charger 30 capable of executing external charging is provided, but the charger 30 may not be provided.

In the example, the hybrid automobile 20 including the engine 22 and at least one motor 24 is configured, but an automobile not including the motor 24 may be configured.

Correspondence relationships between main components in the example and main components described in "SUMMARY" will be described. In the example, the engine cooling device 32 is an example of "a cooling device of an engine", the air conditioner 40 is an example of "an air conditioner", the battery cooling device 36 is an example of "a cooling device for an object to be cooled", the fan 50 is an example of "a fan", the fan driving apparatus 53 of the FCU 52 is an example of "a fan driving apparatus", the microcomputer 61 of the engine ECU 60 is an example of "a first controller", and the microcomputer 71 of the HVECU 70 is an example of "a second controller". The battery 28 is an example of "a power storage device", and the charger 30 is an example of "a charger".

Regarding the correspondence relationships between main components in the example and main components described in "SUMMARY", the example is an example for specifically describing the embodiment of the present disclosure described in "SUMMARY", and thus does not limit the components of the present disclosure described in "SUMMARY". That is, analysis of the present disclosure described in "SUMMARY" has to be performed based on a description of "SUMMARY", and the example is just a specific example of the present disclosure described in "SUMMARY".

While the embodiment of the present disclosure has been described using the example, but an applicable embodiment of the present disclosure is not limited to the above-described example, and it is a matter of course that various modifications can be made without departing from the gist of the present disclosure.

The embodiments of the present disclosure can be used in the automobile manufacturing industry and the like.

What is claimed is:

1. An automobile comprising:
   a fan configured to send cooling air to at least one of a cooling device for an engine, an air conditioner performing air conditioning within an occupant compartment, and a cooling device for an object to be cooled which is different from the engine;
   a fan driving apparatus configured to drive the fan;
   a first electronic control unit connected to the fan driving apparatus through a signal line, the first electronic control unit being configured to output a first driving control signal to the fan driving apparatus through the signal line when an ignition switch is turned off and a predetermined condition is established; and a second electronic control unit connected to the signal line, the second electronic control unit being configured to determine whether or not the first driving control signal has been output to the fan driving apparatus from the first electronic control unit by monitoring the signal line when the ignition switch is turned off, and configured to output a second driving control signal to the fan driving apparatus through the signal line when determination is made that the first driving control signal has not been output to the fan driving apparatus from the first electronic control unit, the ignition switch is turned off, and the predetermined condition is established.

2. The automobile according to claim 1, wherein the second electronic control unit is configured to determine that a request for driving the fan is given when the ignition switch is turned off and pre-air conditioning which is air conditioning within the occupant compartment is executed by the air conditioner.

3. The automobile according to claim 1, further comprising:

a power storage device configured to exchange electric power with a motor; and a charger configured to execute external charging for charging the power storage device by using electric power received from an external power supply, wherein:

the object to be cooled is the power storage device; and the second electronic control unit is configured to determine that a request for driving the fan is given when the ignition switch is turned off and the external charging is executed.

4. The automobile according to claim 1, wherein the signal line includes a filter circuit.

\* \* \* \* \*